US009632449B2

(12) United States Patent
Maeda

(10) Patent No.: US 9,632,449 B2
(45) Date of Patent: Apr. 25, 2017

(54) IMAGE FORMING APPARATUS HAVING CONTROLLED LIGHT EMISSION USING CURRENT ADJUSTMENT

(71) Applicant: CANON KABUSHIKI KAISHA, Tokyo (JP)

(72) Inventor: Yasukazu Maeda, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/963,057

(22) Filed: Dec. 8, 2015

(65) Prior Publication Data

US 2016/0170324 A1    Jun. 16, 2016

(30) Foreign Application Priority Data

Dec. 10, 2014    (JP) ................. 2014-250408

(51) Int. Cl.
   *G03G 15/04*    (2006.01)
   *H04N 1/04*    (2006.01)
   *G03G 15/043*    (2006.01)
   *H04N 1/06*    (2006.01)
   *H04N 1/113*    (2006.01)
   *H04N 1/50*    (2006.01)
   *H04N 1/23*    (2006.01)

(52) U.S. Cl.
   CPC ............ *G03G 15/043* (2013.01); *H04N 1/04* (2013.01); *H04N 1/06* (2013.01); *H04N 1/113* (2013.01); *H04N 1/23* (2013.01); *H04N 1/50* (2013.01)

(58) Field of Classification Search
   CPC ........ G03G 15/043; H04N 1/113; H04N 1/50; H04N 1/06; H04N 1/04; H04N 1/23
   USPC ........ 399/4, 51; 347/237, 247; 358/504, 406
   See application file for complete search history.

(56) References Cited

U.S. PATENT DOCUMENTS

2014/0347708 A1* 11/2014 Omori .................... H04N 1/113
                                                           358/475

FOREIGN PATENT DOCUMENTS

| JP | H07144433 A | 6/1995 |
| JP | 2004106268 A | 4/2004 |
| JP | 2013254173 A | 12/2013 |
| JP | 2013254174 A | 12/2013 |

* cited by examiner

*Primary Examiner* — Sophia S Chen
(74) *Attorney, Agent, or Firm* — Canon USA, Inc. IP Division

(57) ABSTRACT

An adjustment includes a first current adjustment for adjusting a first current Idrv by supplying a superimposed current of the first current Idrv and a second current Ib to an LD 101a, and a second current adjustment for adjusting the second current Ib by supplying the second current Ib to the LD 101a without supplying the first current Idrv thereto. Upon reception of an image forming instruction, a control unit performs adjustment in order of the second current adjustment for the first time, the first current adjustment for the first time, the second current adjustment for the second time, and the first current adjustment for the second time. An execution period of the second current adjustment for the first time is longer than an execution period of the second current adjustment for the second time.

12 Claims, 10 Drawing Sheets

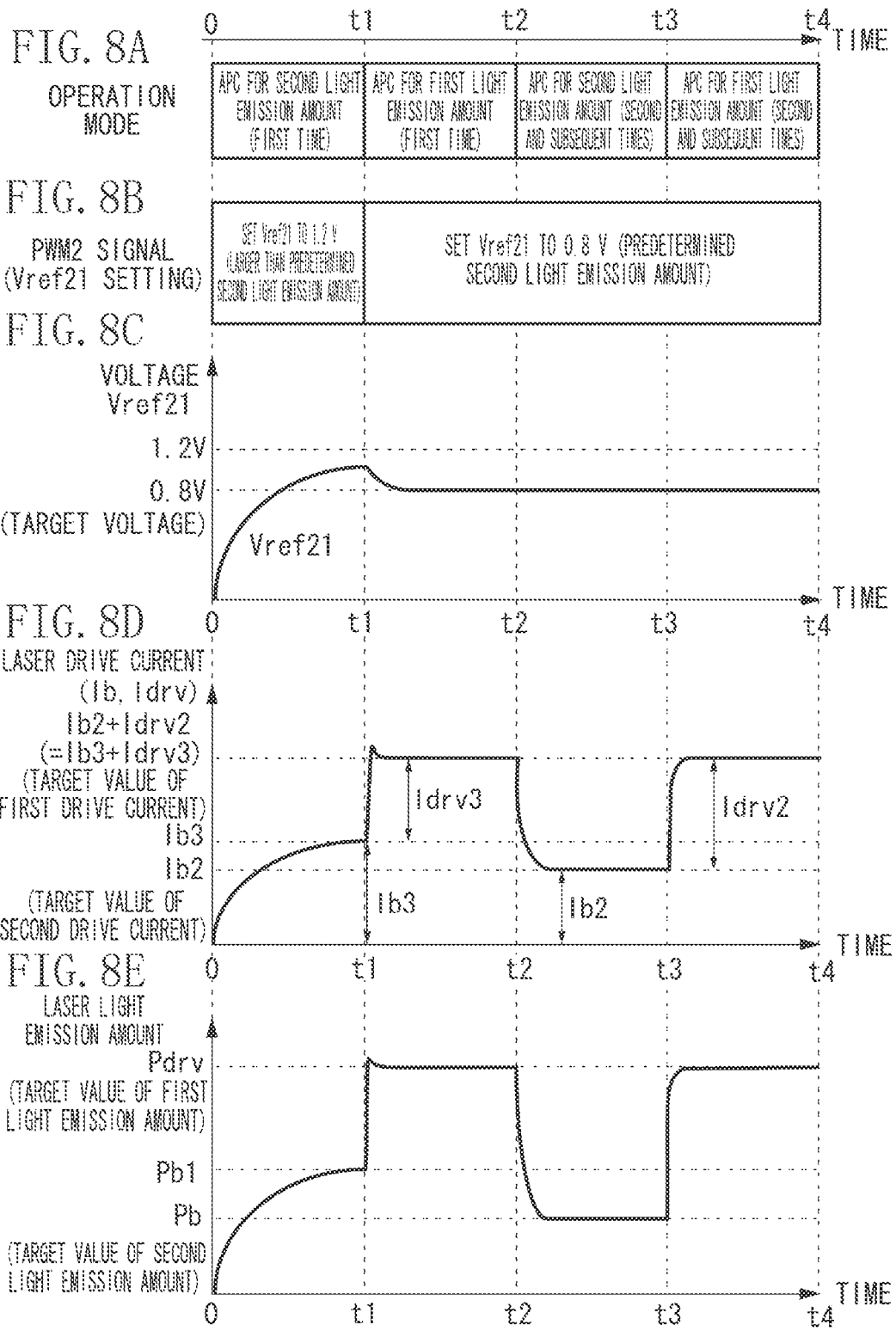

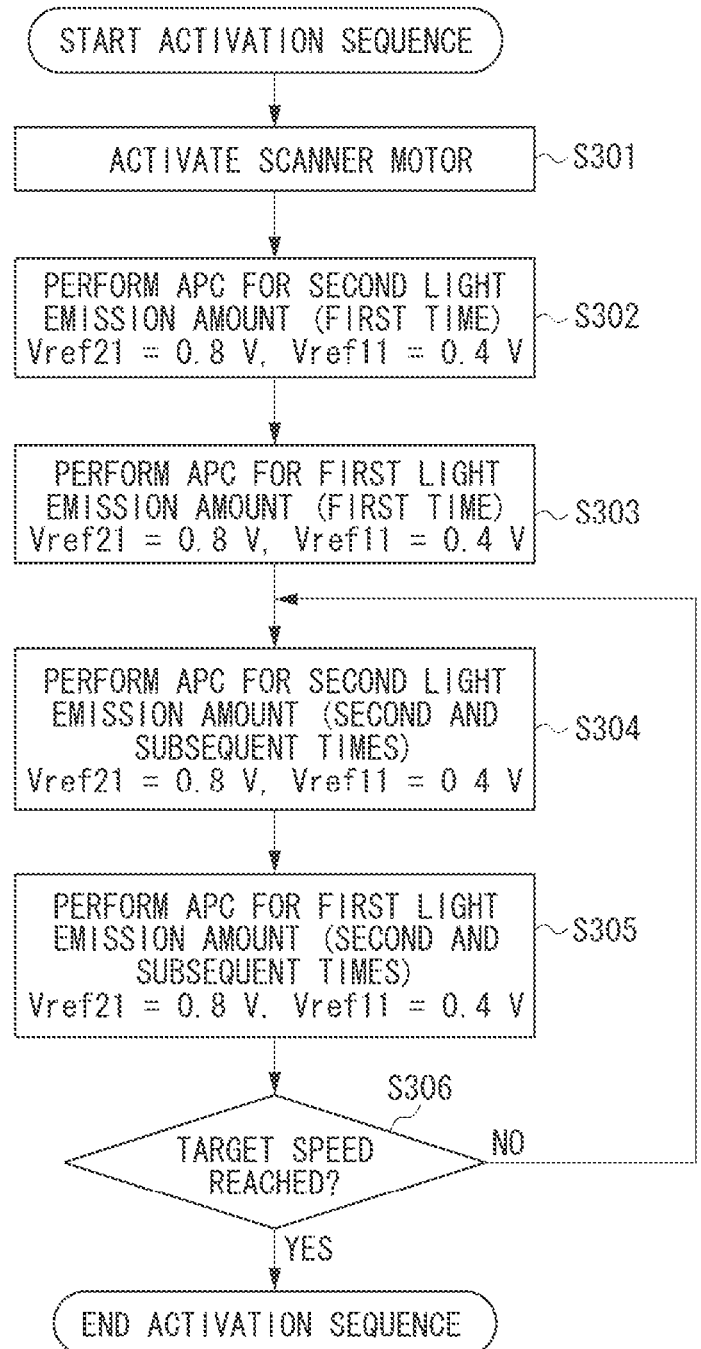

FIG. 10A OPERATION MODE
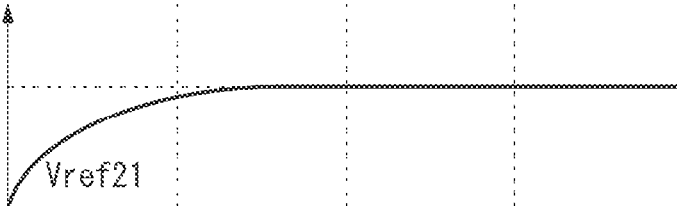
FIG. 10B PWM2 SIGNAL (Vref21 SETTING)
FIG. 10C PWM1 SIGNAL (Vref11 SETTING)
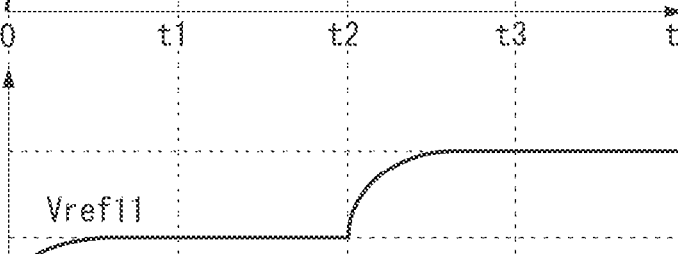
FIG. 10D VOLTAGE Vref21
FIG. 10E VOLTAGE Vref11
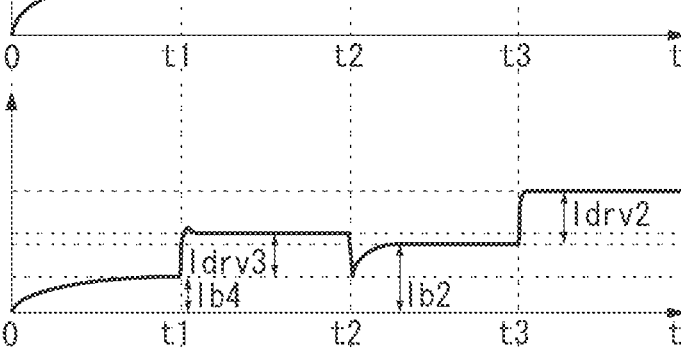
FIG. 10F LASER DRIVE CURRENT (Ib, Idrv)
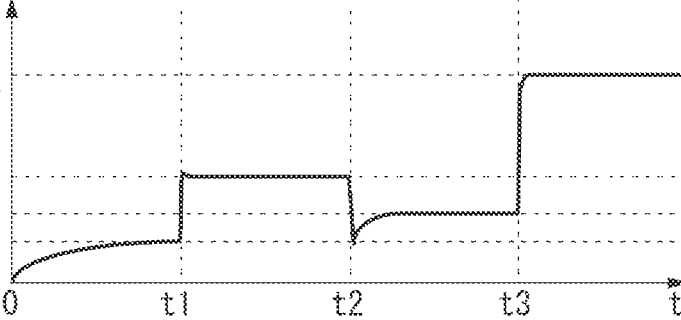
FIG. 10G LASER LIGHT EMISSION AMOUNT

IMAGE FORMING APPARATUS HAVING CONTROLLED LIGHT EMISSION USING CURRENT ADJUSTMENT

BACKGROUND OF THE INVENTION

Field of the Invention

One disclosed aspect of the embodiments relates to an electro-photographic image forming apparatus such as a laser beam printer, a copying machine, and a facsimile.

Description of the Related Art

In recent years, Japanese Patent Application Laid-Open No. 2013-254173 discusses a technique for optimizing the potential of a portion to which toner on a photosensitive member is not adhered, so as to further improve the image quality of an electro-photographic image forming apparatus. More specifically, the technique irradiates an image portion to which toner on the photosensitive member is adhered, with light having a first light emission amount for obtaining a potential at which toner adheres. The technique further irradiates a non-image portion to which toner on the photosensitive member is not adhered, with light having a second light emission amount smaller than the first light emission amount for obtaining a potential at which toner is not adhered.

Japanese Patent Application Laid-Open No. 2013-254173 discusses performing Automatic Power Control (APC) in an adjustment process for adjusting two different levels of light emission amounts (the first light emission amount and the second light emission amount) to stabilize the first and the second light emission amounts, and a sequence in the adjustment process from reception of an image forming instruction until before exposure of a photosensitive member to light.

Japanese Patent Application Laid-Open No. 2013-254173 discusses that, in a sequence in the adjustment process, APC for the second light emission amount and APC for the first light emission amount are alternately performed. Alternately performing APC in this way may cause an overshoot of a drive current supplied to a semiconductor laser light emitting unit. A drive current exceeding the rating of the semiconductor laser due to an overshoot may cause failure of the semiconductor laser.

SUMMARY OF THE INVENTION

One disclosed aspect of the embodiments is directed to a technique for preventing an overshoot of a drive current supplied to a light emitting unit in an adjustment process from reception of an image forming instruction until before an exposure process for exposing a photosensitive member to light.

According to an aspect of the embodiments, an image forming apparatus includes a light emitting unit configured to emit light by being supplied with a current, a light receiving unit configured to receive the light emitted from the light emitting unit and output a value related to a light reception amount, and a control unit configured to control light emission from the light emitting unit, wherein, after reception of an image forming instruction, the control unit performs adjustment for adjusting a superimposed current of first and second currents, and the second current through comparison between the value output from the light receiving unit and a reference value set based on a target setting signal, and after the adjustment, supplies the superimposed current of the first and the second currents or the second current to the light emitting unit to cause the light emitting unit to emit light, wherein the adjustment includes a first current adjustment for adjusting the first current by supplying the superimposed current of the first and the second currents to the light emitting unit, and a second current adjustment for adjusting the second current by supplying the second current to the light emitting unit without supplying the first current thereto, wherein, upon reception of the image forming instruction, the control unit performs adjustment in order of the second current adjustment for the first time, the first current adjustment for the first time, the second current adjustment for the second time, and the first current adjustment for the second time, and wherein an execution period of the second current adjustment for the first time is longer than an execution period of the second current adjustment for the second time.

According to another aspect of the embodiments, an image forming apparatus includes a light emitting unit configured to emit light by being supplied with a current, a light receiving unit configured to receive the light emitted from the light emitting unit and output a value related to a light reception amount, and a control unit configured to control light emission from the light emitting unit, wherein, after reception of an image forming instruction, the control unit performs adjustment for adjusting a superimposed current of first and second currents, and the second current through comparison between the value output from the light receiving unit and a reference value set based on a target setting signal, and after the adjustment, supplies the superimposed current of the first and the second currents or the second current to the light emitting unit to cause the light emitting unit to emit light, wherein the adjustment includes a first current adjustment for adjusting the first current by supplying the superimposed current of the first and the second currents to the light emitting unit, and a second current adjustment for adjusting the second current by supplying the second current to the light emitting unit without supplying the first current thereto, wherein, upon reception of the image forming instruction, the control unit performs adjustment in order of the second current adjustment for the first time, the first current adjustment for the first time, the second current adjustment for the second time, and the first current adjustment for the second time, and wherein a target value of the reference value set for the second current adjustment for the first time via the target setting signal is larger than a target value of the reference value set for the second current adjustment for the second time via the target setting signal.

According to yet another aspect of the embodiments, an image forming apparatus includes a light emitting unit configured to emit light by being supplied with a current, a light receiving unit configured to receive the light emitted from the light emitting unit and output a value related to a light reception amount, and a control unit configured to control light emission from the light emitting unit, wherein, after reception of an image forming instruction, the control unit performs adjustment for adjusting a superimposed current of first and second currents, and the second current through comparison between the value output from the light receiving unit and a reference value set based on a target setting signal, and after the adjustment, supplies the superimposed current of the first and the second currents or the second current to the light emitting unit to cause the light emitting unit to emit light, wherein the adjustment includes a first current adjustment for adjusting the first current by supplying the superimposed current of the first and the second currents to the light emitting unit, and a second current adjustment for adjusting the second current by supplying the second current to the light emitting unit without supplying the first current thereto, wherein, upon reception of the image forming instruction, the control unit performs adjustment in order of the second current adjustment for the first time, the first current adjustment for the first time, the second current adjustment for the second time, and the first current adjustment for the second time, and wherein a target value of the reference value set for the first current adjustment for the first time via the target setting signal is smaller than a target value of the reference value set for the first current adjustment for the second time via the target setting signal.

Further features of the disclosure will become apparent from the following description of exemplary embodiments with reference to the attached drawings.

BRIEF DESCRIPTION OF THE DRAWINGS

FIGS. 8A, 8B, 8C, 8D, and 8E illustrate changes with time of an operation mode, a pulse width modulation (PWM)2 signal, a voltage Vref21, a laser drive current, and a laser light amount, respectively, in an activation sequence according to the second exemplary embodiment.

FIG. 9 is a flowchart illustrating an activation sequence of a laser scanner according to a third exemplary embodiment.

FIGS. 10A, 10B, 10C, 10D, 10E, 10F, and 10G illustrate changes with time of an operation mode, a PWM2 signal, a PWM1 signal, a voltage Vref21, a voltage Vref11, a laser drive current, and a laser light amount, respectively, in an activation sequence according to the third exemplary embodiment.

DESCRIPTION OF THE EMBODIMENTS

Exemplary embodiments will be described below. However, components described in the exemplary embodiments are to be considered as illustrative and not restrictive of the scope of the disclosure.

[Image Forming Apparatus]

Figure 2:
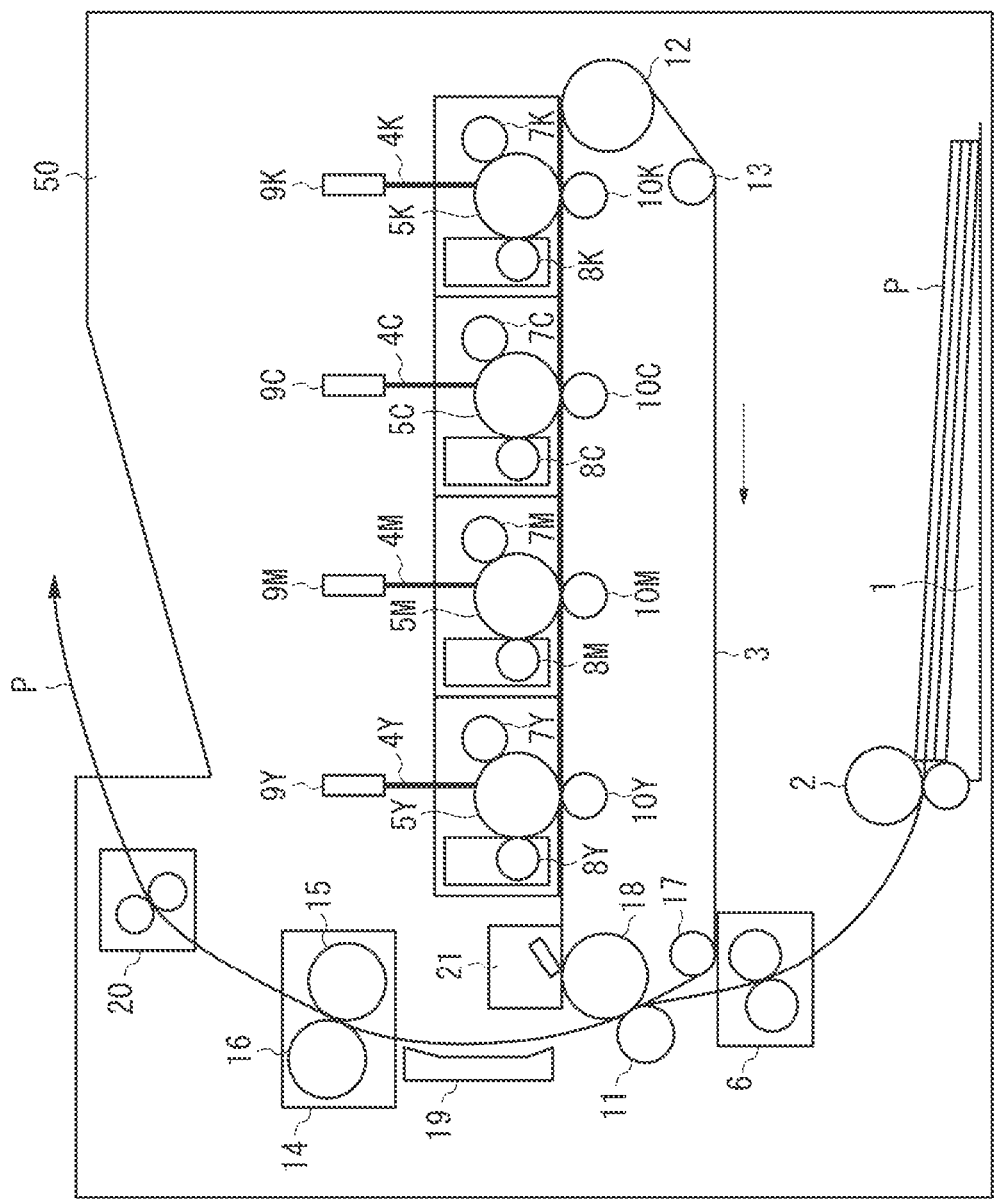
FIG. 2 illustrates an example of a schematic cross sectional view of an image forming apparatus.

FIG. 2 is a cross sectional view schematically illustrating a color image forming apparatus. As illustrated in FIG. 2, a color laser beam printer 50 includes a plurality of photosensitive drums 5 (5Y, 5M, 5C, and 5K) each serving as a photosensitive member. The color laser beam printer 50 sequentially and continuously transfers images onto an intermediate transfer belt 3 in an overlapped way to obtain a full color print image.

The intermediate transfer belt 3 is an endless belt, and is suspended by a drive roller 12, a tension roller 13, an idler roller 17, and a secondary transfer counter roller 18. The intermediate transfer belt 3 is rotating in the direction indicated by an arrow in FIG. 2, at a process speed of 115 mm/sec. The drive roller 12, the tension roller 13, and the secondary transfer counter roller 18 are support rollers for supporting the intermediate transfer belt 3. The drive roller 12 and the secondary transfer counter roller 18 are configured with φ24, and the tension roller 13 is configured with φ16.

The four photosensitive drums 5 (5Y, 5M, 5C, and 5K) are disposed in series in the moving direction of the intermediate transfer belt 3. In the rotation process, the photosensitive drum 5Y having a developing unit 8Y is uniformly charged to a predetermined polarity and a predetermined potential by a primary charging roller 7Y. Then, the photosensitive drum 5Y is irradiated with laser light 4Y by an optical scanning device 9Y serving as a light irradiation unit. Accordingly, an electrostatic latent image corresponding to a first color (yellow) component image of a target color image is formed. Subsequently, yellow toner (developer) as the first color is adhered to the electrostatic latent image by the first developing unit (yellow developing unit) 8Y, and the electrostatic latent image is developed. Through this procedure, the image is visualized. Such a developing method of adhering toner to a portion where an electrostatic latent image is formed through light irradiation is referred to as a "reversal developing method."

The yellow toner image (developer image) formed on the photosensitive drum 5Y enters a primary transfer nip portion between the photosensitive drum 5Y and the intermediate transfer belt 3. At the primary transfer nip portion, a voltage application member (primary transfer roller) 10Y is in contact with the back side of the intermediate transfer belt 3. A primary transfer bias power source (not illustrated) for enabling bias voltage application is connected to the voltage application member 10Y. The yellow toner image is first transferred onto the intermediate transfer belt 3 in a first color port.

Then, through a process equivalent to the above-described process for the yellow toner image, a magenta, a cyan, and a black toner images formed on the photosensitive drums 5M, 5C, and 5K, respectively, are sequentially transferred onto the yellow toner image in an overlapped way. A four-color toner image formed on the intermediate transfer belt 3 is rotated in the direction indicated by the arrow in FIG. 2 (clockwise rotation) together with the intermediate transfer belt 3.

Meanwhile, a recording material P stacked and stored in a sheet supplying cassette 1 is fed by a feed roller 2, and conveyed to a nip portion of a registration roller pair 6 to be temporarily stopped. The recording material P temporarily stopped is then supplied to a secondary transfer nip portion by the registration roller pair 6 in synchronization with the timing when the four-color toner image formed on the intermediate transfer belt 3 reaches the secondary transfer nip portion. Then, the toner image on the intermediate transfer belt 3 is transferred onto the recording material P by a voltage (about +1.5 kV) applied between a secondary transfer roller 11 and the secondary transfer counter roller 18.

The recording material P on which the toner image is transferred is separated from the intermediate transfer belt 3, and then is fed to a fixing device 14 via a conveyance guide 19. In the fixing device 14, the toner image is heated and pressed by a fixing roller 15 and a pressing roller 16, respectively, to be melted and fixed onto the recording material P. A full color image of four colors is thereby obtained. Then, the recording material P is discharged to the outside of the image forming apparatus by a discharge roller pair 20. This completes one print cycle. Meanwhile, residual toner remaining on the intermediate transfer belt 3 without being transferred onto the recording material P at the secondary transfer portion is removed by a cleaning unit 21 disposed on the downstream side of the secondary transfer portion in a conveyance direction.

This completes descriptions of the image forming apparatus and its operations.

In the image forming apparatus according to a first exemplary embodiment, to prevent fogging, reversal fogging, and other image failures, optical scanning devices 9 (9Y, 9M, 9C, and 9K) irradiate portions (non-image portions) to which respective colors of toner on the surfaces of the photosensitive drums 5 are not adhered, with light having a small light emission amount. Irradiating the photosensitive drums 5 with the light having a small light emission amount changes the potential of the surfaces of the charged photosensitive drums 5 to a proper level of potential at which toner is not adhered. To change the potential of the surfaces of the charged photosensitive drums 5 to a potential at which toner is adhered, the optical scanning devices 9 (9Y, 9M, 9C, and 9K) irradiate portions to which the respective colors of toner on the surfaces of the photosensitive drums 5 are adhered, with normally emitted light.

In connection with a laser drive system, the following first describes an external view of the optical scanning device 9 serving as each of the optical scanning devices 9 (9Y, 9M, 9C, and 9K), and then describes in detail the circuit configuration of the laser drive system.

[Optical Scanning Device]

Figure 3:
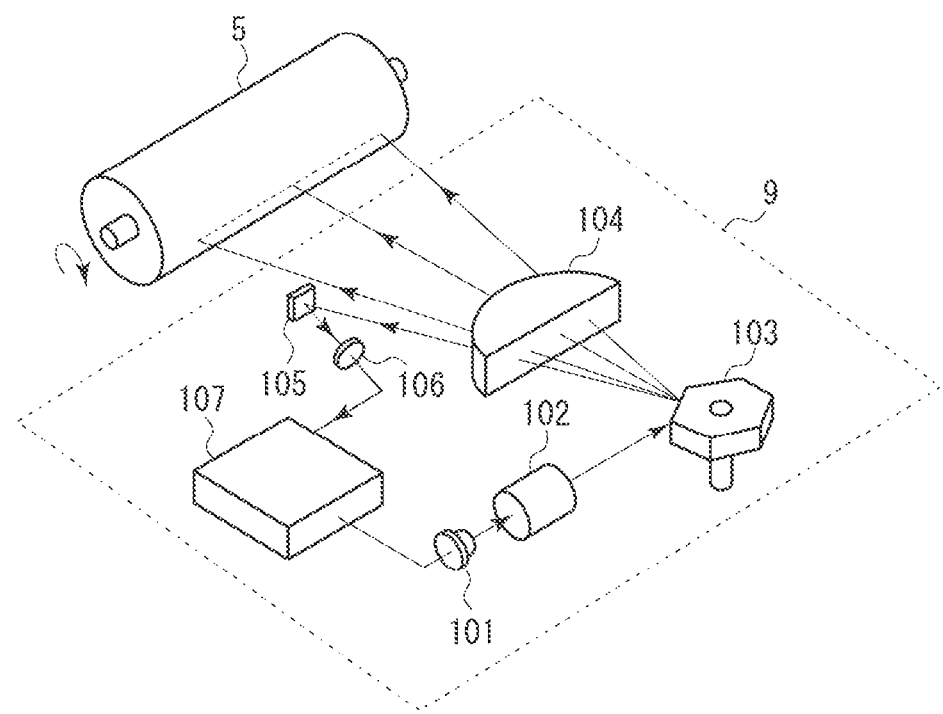
FIG. 3 illustrates an example of an external view of an optical scanning device.

FIG. 3 illustrates a schematic view of the optical scanning device 9 serving as a light irradiation unit. Since the optical scanning devices 9Y, 9M, 9C, and 9K have a similar configuration, hereinafter, the optical scanning device 9 will be described as a representative of the optical scanning devices 9Y, 9M, 9C, and 9K. A drive current is applied to (flows in) a laser diode element 101 serving as a light emitting element, by a laser drive circuit 107. The laser diode element 101 emits laser light having a light emission amount according to the applied drive current. As described below, the laser drive circuit 107 is electrically connected to an engine controller 108 and a video controller 109 to drive the laser diode element 101.

A laser light beam emitted from the laser diode element 101 is shaped and collimated by a collimator lens 102, and then enters a rotating polygon mirror 103. Then, the laser light beam is reflected by the polygon mirror 103 and is transmitted through an fθ lens 104 to be focused on the photosensitive drum 5 as a dot-shaped spot image. When the polygon mirror 103 rotates, the laser light is deflected, and a spot of the laser light moves on the photosensitive drum 5 in the rotational axis direction of the photosensitive drum 5. With the deflection of the laser light by the rotation of the polygon mirror 103 and the rotation of the photosensitive drum 5 itself, the surface of the photosensitive drum 5 is scanned with the laser light to form a latent image thereon.

An area through which the laser light reflected by the polygon mirror 103 passes when the photosensitive drum 5 is irradiated with the laser light is referred to as a scan area. A mirror 105 is disposed adjacent to an end portion of the scan area in the scanning direction of the laser light (the rotational axis direction of the photosensitive drum 5). A Beam Detect (BD) sensor 106 is disposed on the optical path of the laser light reflected by the mirror 105. When the BD sensor 106 detects the incidence of the laser light, it outputs a signal. Detecting the laser light using the BD sensor 106 in this way enables the detection of the rotational phase of the polygon mirror 103. To start scanning with the laser light from a desired position on the photosensitive drum 5, the start timing of laser light emission for starting scanning is determined based on the output from the above-described BD sensor 106.

To cause the laser light to enter the BD sensor 106 and obtain an output from the BD sensor 106 for each reflection surface of the polygon mirror 103 while the polygon mirror 103 is being rotated to form a latent image, the laser diode element 101 is forced to emit light for a predetermined period of time from a predetermined timing. The predetermined timing refers to a timing when the polygon mirror 103 is rotated by a predetermined angle so that the laser light can enter the BD sensor 106 again, with respect to the timing when the output has been last obtained from the BD sensor 106. The predetermined angle approximately corresponds to an angular range in which one reflection surface of a plurality of reflection surfaces of the polygon mirror 103 reflects the laser light. As illustrated in FIG. 3, when the polygon mirror 103 is a hexagonal mirror, the angular range in which scanning is performed with one reflection surface is 60 (=360/6) degrees, and the above-described predetermined angle is set to a value less than 60 degrees. Therefore, by forcibly causing the laser diode element 101 to emit light for a predetermined period of time at a predetermined timing after an output is obtained from the BD sensor 106, the next output can be obtained from the BD sensor 106.

While the laser diode element 101 is being forced to emit light, Automatic Power Control (APC), i.e., automatic light amount control for adjusting the laser emission amount is performed at the same time. The APC will be described in detail below.

[Laser Drive System]

Next, a method for causing the laser diode element 101 to emit light having a first light emission amount (the light emission amount for image portions) and a second light emission amount (the light emission amount for non-image portions) will be described below with reference to FIG. 4.

The laser diode element 101 includes a laser diode (hereinafter referred to as an LD 101a) serving as a light emitting unit for emitting laser light, and a photodiode (hereinafter referred to as a PD 101b) serving as a light receiving unit for receiving the light emitted from the LD 101a. The engine controller 108 is not illustrated in FIGS. 2 and 3. The engine controller 108 includes an application specific integrated circuit (ASIC) 1081, a central processing unit (CPU) 1082, a random access memory (RAM) 1083, and an electrically erasable programmable read only memory (EEPROM) 1084, and has a role of controlling a drive circuit in the image forming apparatus including the laser drive circuit 107. The engine controller 108 and the laser drive circuit 107 serve as a control unit for controlling the light emission by the laser diode element 101. The video controller 109 includes an image memory. The video controller 109 illustrated in FIG. 4 has a role of generating a Data signal (VIDEO signal) based on print data sent from an externally connected reader scanner and an external apparatus such as a host computer.

A BD signal input to the engine controller 108 is a signal generated when the BD sensor 106 detects laser light for each scanning.

An SH1 signal output from the engine controller 108 is used to switch between a sample state and a hold state of a sample/hold circuit 309 (described below). An SH2 signal is used to switch between a sample state and a hold state of a sample/hold circuit 409 (described below). An SH3 signal is used to switch between ON and OFF of a switching circuit 414. An SH4 signal is used to switch between ON and OFF of a switching circuit 314. A pulse width modulation (PWM)1 signal and a PWM2 signal are used to set reference voltages Vref11 and Vref21 (described below), respectively. A Base signal is used to switch between ON and OFF of a switching circuit 413. A Ldrv signal is input to an OR circuit 112, and is used to switch between ON and OFF of the Data signal. A Venb signal is connected to the enable (ENB) terminal of a buffer 111 having the enable (ENB) terminal, and is used to switch between ON and OFF of the VIDEO signal. The VIDEO signal is input from the video controller 109 to the buffer 111 having the enable (ENB) terminal. An /ACC signal and a /DEC signal are used to perform acceleration and deceleration control of a scanner motor 110 for rotating the polygon mirror 103 illustrated in FIG. 3.

The laser drive circuit 107 further includes comparator circuits 307 and 407, variable resistors 306 and 406, the sample/hold circuits 309 and 409, sample/hold capacitors 308 and 408, operational amplifiers 310 and 410, transistors 311 and 411, drive current setting resistors 312 and 412, and switching circuits 313, 314, 413, and 414. PWM circuits 301 and 401 will be described below. The PWM circuits 301 and 401 include inverters 303 and 403, resistors 304 and 404 for smoothing the PWM1 and PWM2 signals, capacitors 305 and 405 for smoothing the PWM1 and PWM2 signals, and pull-down resistors 302 and 402, respectively. In the PWM circuit 301, when the PWM1 signal as a target setting signal for APC for the first light emission amount is input, the capacitor 305 is charged based on the duty of the PWM1 signal. Accordingly, the voltage value of the reference voltage Vref11 output from the capacitor 305 is controlled to be a target value determined based on the duty of the PWM1 signal. In the PWM circuit 401, when the PWM2 signal as a target setting signal for APC for the second light emission amount is input, the capacitor 405 is charged based on the duty of the PWM2 signal. Accordingly, the voltage value of the reference voltage Vref21 output from the capacitor 405 is controlled to be a target value determined based on the duty of the PWM2 signal. The reference voltages Vref11 and Vref21 are input to the positive terminals of the comparator circuits 307 and 407, respectively. The output signals of the comparator circuits 307 and 407 are input to the sample/hold circuits 309 and 409, respectively. The reference voltage Vref11 is a reference value of the first light emission amount of the LD 101a. The reference voltage Vref21 is a reference value of the second light emission amount of the LD 101a.

The output signals of the sample/hold capacitors 308 and 408 connected to the sample/hold circuits 309 and 409 are input to the positive terminals of the operational amplifiers 310 and 410, respectively.

The drive current setting resistor 312 and the emitter terminal of the transistor 311 are connected to the negative terminal of the operational amplifier 310. The output signal of the operation amplifier 310 is input to the base terminal of the transistor 311. The drive current setting resistor 412 and the emitter terminal of the transistor 411 are connected to the negative terminal of the operational amplifier 410. The output signal of the operational amplifier 410 is input to the base terminal of the transistor 411. The collector terminals of the transistors 311 and 411 are connected to the switching circuits 313 and 413, respectively. Drive currents Idrv and Ib of the LD 101a according to the output voltages of the sample/hold circuits 309 and 409 are determined by the operational amplifiers 310 and 410, the transistors 311 and 411, and the drive current setting resistors 312 and 412, respectively. The switching circuit 313 turns ON and OFF based on the Data signal based on the image data signal for forming a latent image on the photosensitive drum 5. The switching circuit 413 turns ON and OFF based on the Base signal. The output terminals of the switching circuits 313 and 413 are connected to the cathode of the LD 101a to supply the drive currents Idrv and Ib, respectively. More specifically, the switching circuits 313 and 413 supply the second drive current Ib or a drive current (Ib+Idrv), a superimposed current of the second drive current Ib and the first drive current Idrv, to the LD 101a. When the LD 101a is supplied with the second drive current Ib, the LD 101a emits light with the second light emission amount. When the LD 101a is supplied with the drive current (Ib+Idrv), the LD 101a emits light with the first light emission amount. The first light emission amount refers to a light emission amount for attenuating the surface potential of the charged photosensitive drum 5 to a potential for electrostatically adhering toner. The LD 101a emits laser light having the first light emission amount when irradiating portions (image portions) to which toner on the photosensitive drum 5 is adhered. The second light emission amount refers to a light emission amount for attenuating the surface potential of the charged photosensitive drum 5 to a potential for suppressing fogging and for not electrostatically adhering toner. The LD 101a emits laser light having the second light emission amount when irradiating portions (non-image portions) to which toner on the photosensitive drum 5 is not adhered. In this way, the light emission of the LD 101a is controlled based on the two different levels of light emission amounts (the first and the second light emission amounts).

The anode of the LD 101a is connected to a power source Vcc. The cathode of the PD 101b for monitoring the light amount of the LD 101a is connected to the power source Vcc. The anode of the PD 101b is connected to the switching circuits 314 and 414. In APC control, the PD 101b supplies a monitor current Im to the variable resistors 306 and 406 to convert the monitor current Im into a monitor voltage Vm. The monitor voltage Vm is input to the negative terminals of the comparator circuits 307 and 407.

Figure 4:
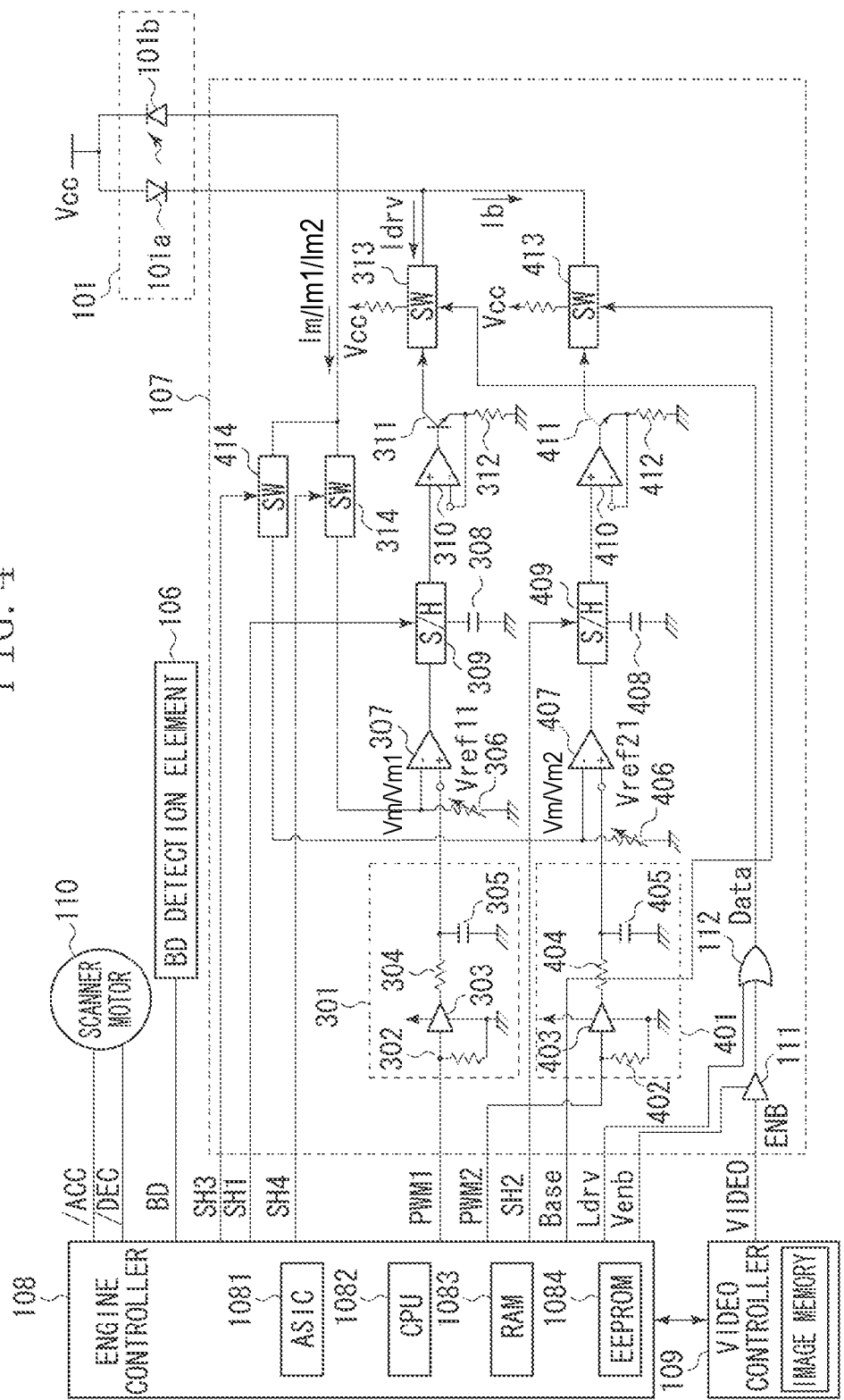
FIG. 4 illustrates an example of a laser drive system circuit having a superimposing system 2-level light emission amount adjusting function.

Although, in FIG. 4, the engine controller 108 and the video controller 109 are separately illustrated, the configuration is not limited thereto. In addition, a part or whole of the laser drive circuit 107 may be included in the engine controller 108, for example.

[APC for Second Light Emission Amount and APC for First Light Emission Amount]

Next, in connection with light emission control for the LD 101a with the two different levels of light emission amounts in the laser drive circuit 107, the following describes operations in APC for the second light emission amount and APC for the first light emission amount. APC, an abbreviation for Automatic Power Control, refers to monitoring the light amount of the LD 101a and adjusting the light amount of the LD 101a through feedback control.

APC for the second light emission amount is a process (second current adjustment process) for adjusting the second drive current Ib. In the operation of APC for the second light emission amount, the CPU 1082 instructs the ASIC 1081 to set the voltage value of the reference voltage Vref21 via the PWM2 signal, and to set the sample/hold circuit 309 to the hold state (in a non-sampling period) via the SH1 signal. The ASIC 1081 further sets the switching circuit 313 to the OFF operating state via the Data signal. The ASIC 1081 disables the Venb signal connected to the enable (ENB) terminal of the buffer 111 having the enable (ENB) terminal, and controls the Ldrv signal to turn OFF the Data signal. The ASIC 1081 turns the switching circuit 414 ON via the SH3 signal, and turns the switching circuit 314 OFF via the SH4 signal. The ASIC 1081 further sets the sample/hold circuit 409 to the sampling state via the SH2 signal, and sets the switching circuit 413 to the ON operating state via the Base signal. The time period during which the sample/hold circuit 409 is in the sampling state is equivalent to APC for the second light emission amount (second adjustment process) for automatically adjusting the second light emission amount. The second drive current Ib is supplied to the LD 101a during execution of APC for the second light emission amount. When the LD 101a emits light in this state, the PD 101b monitors the light emission amount of the LD 101a, and generates a monitor current Im2 proportional to the relevant light emission amount. Supplying the monitor current Im2 to the switching circuit 414 and the variable resistor 406 generates a monitor voltage Vm2 at the negative terminal of the comparator circuit 407. The comparator circuit 407 compares the monitor voltage Vm2 with the reference voltage Vref21 for the second light emission amount as a reference value, and adjusts the second drive current Ib so that the difference between the monitor voltage Vm2 and the reference voltage Vref21 becomes zero.

In the execution of APC for the first light emission amount and in normal image forming (a time period during which an image signal is being sent), the sample/hold circuit 409 is in the hold state to maintain the second light emission amount. To prevent fogging and reversal fogging of toner, it is necessary to constantly stabilize the second light emission amount during image forming.

On the other hand, APC for the first light emission amount is a process (first current adjustment process) for adjusting the first drive current Idrv. In the operation of APC for the first light emission amount, the ASIC 1081 sets the voltage value of the reference voltage Vref11 via the PWM1 signal, and sets the sample/hold circuit 409 to the hold state (in a non-sampling period) via the SH2 signal. The ASIC 1081 further sets the switching circuit 413 to the ON operating state via the Base signal. Thus, the second drive current Ib is supplied to the LD 101a. The ASIC 1081 turns the switching circuit 414 OFF via the SH3 signal, and turns the switching circuit 314 ON via the SH4 signal. The ASIC 1081 further sets the sample/hold circuit 309 to the sampling state via the SH1 signal, and sets the switching circuit 313 to the ON operating state via the Data signal. More specifically, in this state, the ASIC 1081 controls the Ldrv signal to set the Data signal so that the LD 101a emits light. The time period during which the sample/hold circuit 309 is in the sampling state is equivalent to APC for the first light emission amount (first adjustment process) for automatically adjusting the first light emission amount. The drive current (Ib+Idrv), a superimposed current of the first drive current Idrv and the second drive current Ib, is supplied to the LD 101a during execution of APC for the first light emission amount. When the LD 101a emits light in this state, the PD 101b monitors the light emission amount of the LD 101a, and generates a monitor current Im1 (Im1>Im2) proportional to the relevant light emission amount. If the monitor current Im1 is supplied to the switching circuit 314 and the variable resistor 306, a monitor voltage Vm1 is generated. The comparator circuit 307 compares the monitor voltage Vm1 with the reference voltage Vref11 for the first light emission amount as a reference value, and adjusts the first drive current Idrv so that the difference between the monitor voltage Vm1 and the reference voltage Vref11 becomes zero.

In normal image forming, the ASIC 1081 sets the sample/hold circuit 309 to the hold state via the SH1 signal, and the switching circuit 313 turns ON and OFF according to the Data signal to apply the pulse width modulation to the drive current Idrv, thereby performing image forming.

[APC in Activation Sequence of Conventional Laser Scanner]

APC in the activation sequence of a conventional laser scanner will be described below. FIGS. 1A, 1B, 1C, and 1D illustrate changes with time of the operation mode, a voltage Vref, the drive current, and the light emission amount, respectively, in the activation sequence of the conventional laser scanner. FIGS. 1A, 1B, 1C, and 1D illustrate changes with time of the operation mode, the reference voltage Vref21, the drive current of the light emitting element, and the light emission amount of the light emitting element, respectively. Referring to FIGS. 1A, 1B, 1C, and 1D, time 0 (t=0) is the timing for starting the activation sequence of the laser scanner, time 0 to t1 is the execution period of APC for the second light emission amount (first time), time t1 to t2 is the execution period of APC for the first light emission amount (first time), time t2 to t3 is the execution period of APC for the second light emission amount (second time), and time t3 to t4 is the execution period of APC for the first light emission amount (second time). APC for the first light emission amount is an operation mode for adjusting the first light emission amount for charging and adhering developer such as toner to image portions on the photosensitive drum 5. APC for the second light emission amount is an operation mode for adjusting the second light emission amount for not charging and adhering developer such as toner to non-image portions on the photosensitive drum 5. In the control of a laser scanner having a rotating polygon mirror, the laser scanner is activated to start the rotation of the rotating polygon mirror, and then, APC for the first light emission amount and APC for the second light emission amount are alternately performed to achieve a predetermined speed (predetermined number of rotations) of the rotating polygon mirror.

Referring to FIGS. 1A, 1B, 1C, and 1D, at time 0 (t=0), the laser scanner is activated to start the rotation of the rotating polygon mirror. APC for the second light emission amount performed for the first time after the rotation start is referred to as APC for the second light emission amount (first time). APC for the first light emission amount performed for the first time after the rotation start is referred to as APC for the first light emission amount (first time). APC for the second light emission amount performed for the second time is referred to as APC for the second light emission amount (second time). APC for the first light emission amount performed for the second time is referred to as APC for the first light emission amount (second time).

Figure 1:
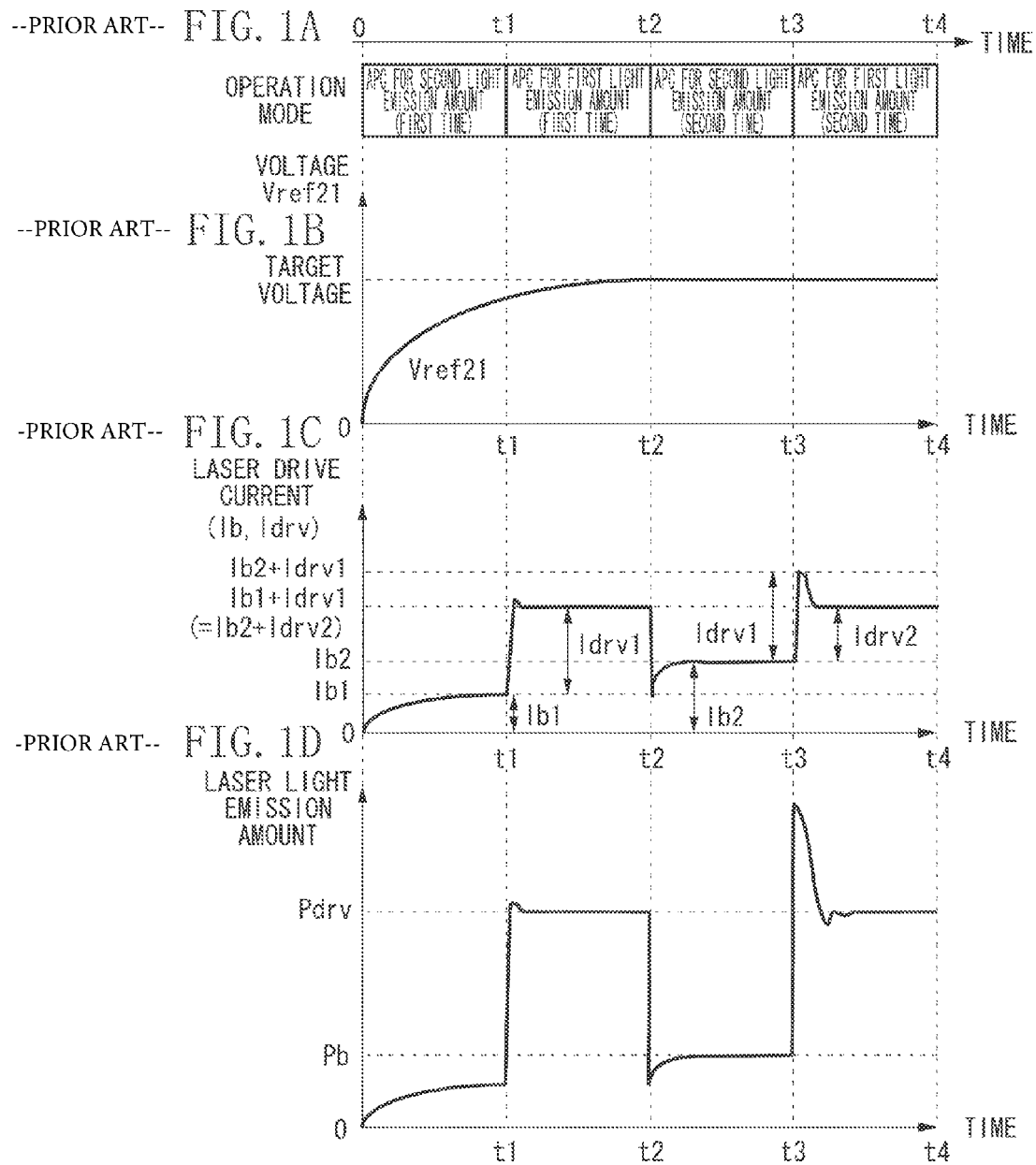
FIGS. 1A, 1B, 1C, and 1D illustrate a problem in an operation mode in an activation sequence of a laser scanner.

In time 0 to t1 illustrated in FIGS. 1B and 1C, the voltage value of the reference voltage Vref21 in APC for the second light emission amount (first time) has not reached the target value determined based on the duty of the PWM2 signal, and the second drive current Ib reaches Ib1, which is smaller than the target current value. This is because, when charging the capacitor 405 based on the PWM2 signal in the PWM circuit 401, it takes time to charge the capacitor 405 from a state where it is almost uncharged to a state where the reference voltage having the same voltage value as the target value can be output. In other words, in time 0 to t1, the capacitor 405 cannot be fully charged because of the influence of the time constant of the PWM circuit 401, and hence only the reference voltage Vref21 having a voltage value lower than the target value can be output.

When the second drive current Ib is Ib1, in time t1 to t2 illustrated in FIG. 1C (APC for the first light emission amount (first time)), the drive current Idrv is adjusted to Idrv1, which is larger than a target current value Idrv2.

Then, in APC for the second light emission amount (second time), the reference voltage Vref21 has reached the predetermined target voltage value, and accordingly the second drive current Ib becomes a target current value Ib2. Then, in time t3 to t4 illustrated in FIG. 1C (APC for the first light emission amount (second time)), the drive current Idrv in the first drive current (Ib+Idrv) is adjusted so that the light emitting element emits light with a target value Pdrv of the first light emission amount. However, immediately after execution of APC for the first light emission amount (second time), the first drive current (Ib2+Idrv1), a superimposed current of Idrv1 and Ib2, is supplied to the light emitting element. In this state, the first drive current (Ib2+Idrv1) is larger than the target first drive current (Ib2+Idrv2). Therefore, in time t3 to t4 illustrated in FIG. 1D, an overshoot of the light emission amount occurs.

When an overshoot of the light emission amount exceeds the absolute maximum rating of the LD 101a, the laser diode element 101 may fail depending on a case.

[Method for Activating Optical Scanning Device]

Operations in the activation sequence of the laser scanner according to the first exemplary embodiment (operations performed when activating the laser drive circuit 107) will be described below.

Figure 5:
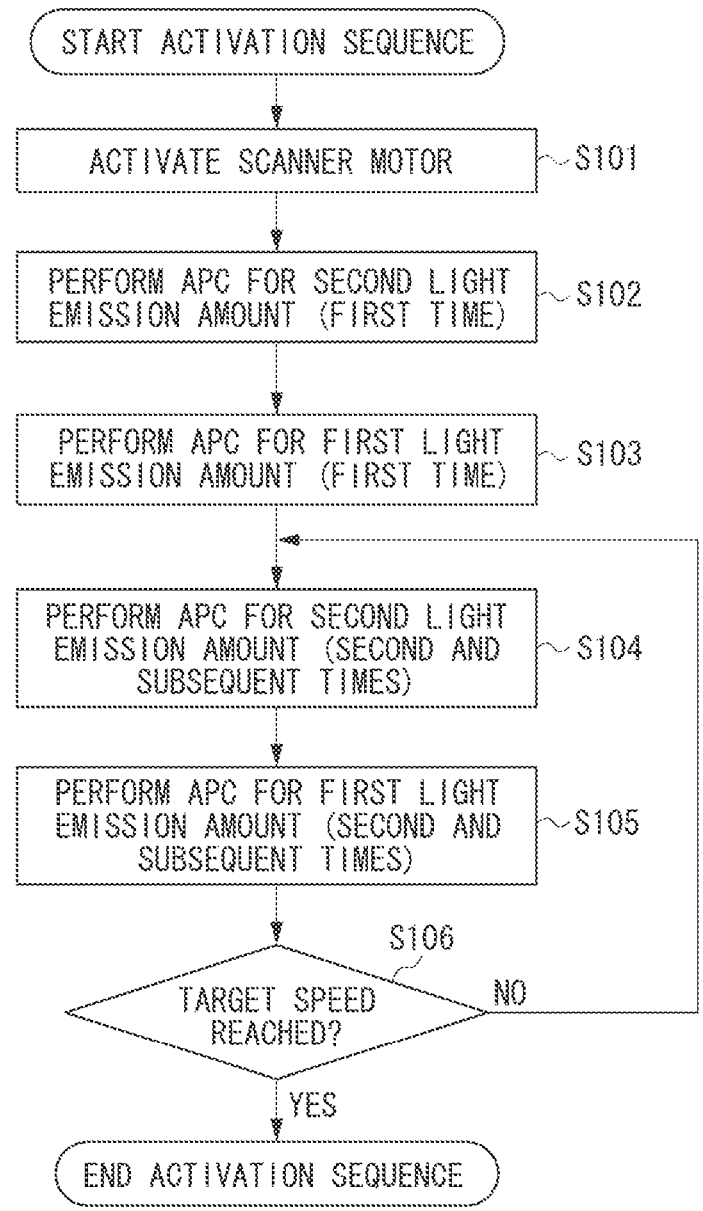
FIG. 5 is a flowchart illustrating an activation sequence of the laser scanner according to a first exemplary embodiment.

FIG. 5 is a flowchart illustrating an activation sequence of the laser scanner. This processing is performed by the CPU 1082. FIGS. 6A, 6B, 6C, and 6D illustrate changes with time of the operation mode, the reference voltage Vref21, the drive current, and the light emission amount, respectively, in the activation sequence of the laser scanner. FIGS. 6A, 6B, 6C, and 6D illustrate the operation mode, the reference voltage Vref21, the drive current of the light emitting element, and the light emission amount of the light emitting element, respectively. Time 0 (t=0) illustrated in FIGS. 6A, 6B, 6C, and 6D corresponds to step S101 in the flowchart illustrated in FIG. 5. At this timing, the laser drive circuit 107 starts the activation sequence of the laser scanner.

Upon reception of an image forming instruction from a host computer (not illustrated), in step S101 illustrated in FIG. 5, the CPU 1082 communicates with the ASIC 1081 to instruct the ASIC 1081 to activate the scanner motor 110. The operation mode in the activation sequence of the laser scanner illustrated in FIG. 5 indicates a process for adjusting the drive current to be supplied to the LD 101a. In step S102, the CPU 1082 instructs the ASIC 1081 to perform APC for the second light emission amount (first time). In time 0 to t1 illustrated in FIGS. 6A and 6B, the ASIC 1081 sets the execution period of APC for the second light emission amount (first time) to a value longer than the time required for the reference voltage Vref21 to reach the target voltage and become stable.

Figure 6:
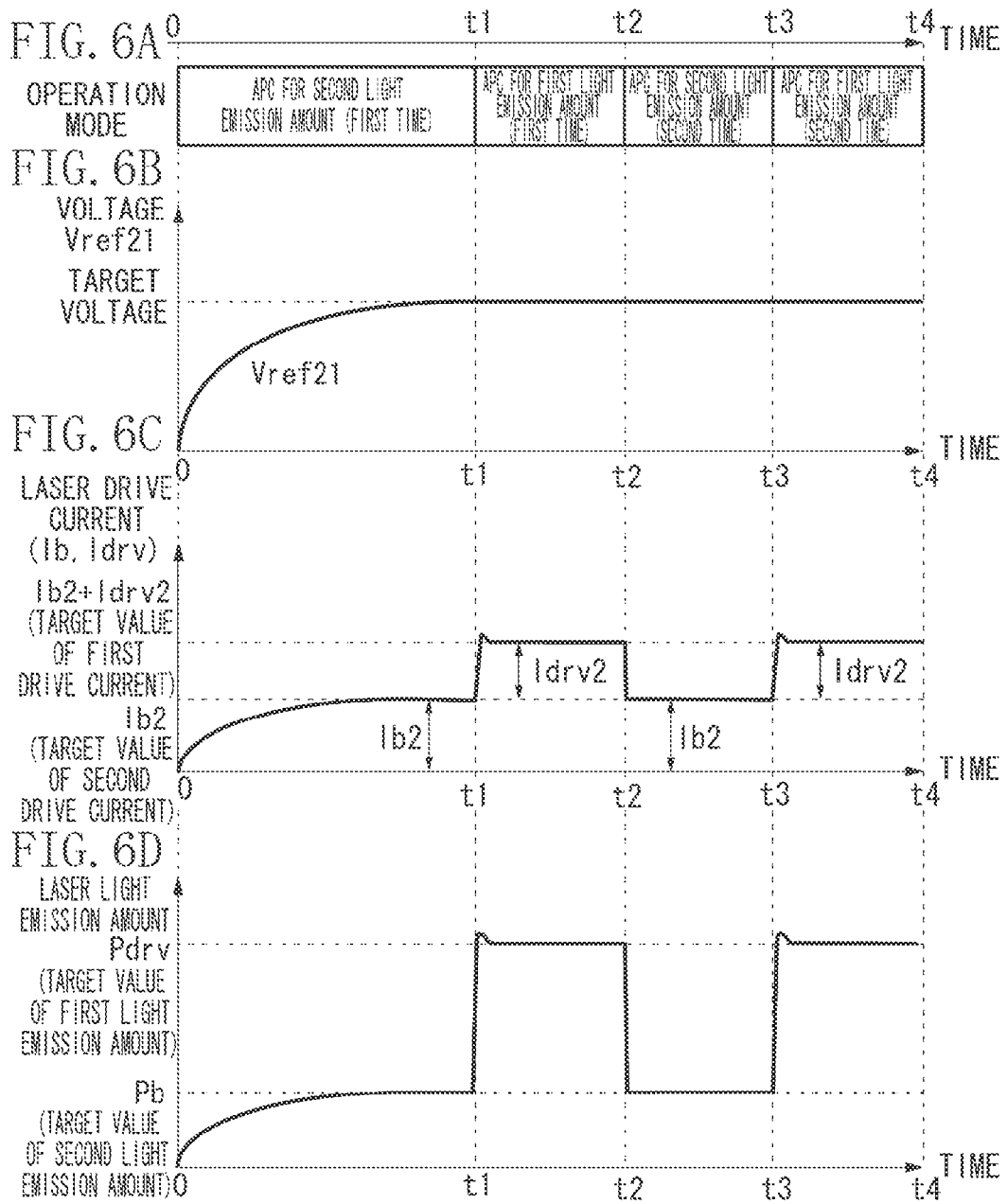
FIGS. 6A, 6B, 6C, and 6D illustrate changes with time of an operation mode, a voltage Vref21, a laser drive current, and a laser light amount, respectively, in the activation sequence according to the first exemplary embodiment.

As a result, in time 0 to t1 illustrated in FIG. 6C, the second drive current Ib reaches the target current value Ib2. In time 0 to t1 illustrated in FIG. 6D, the second light emission amount is also adjusted to the target value Pb.

In step S103 illustrated in FIG. 5, the CPU 1082 instructs the ASIC 1081 to perform APC for the first light emission amount (first time). In this step, in time t1 to t2 illustrated in FIGS. 6C and 6D, the laser drive circuit 107 adjusts the drive current Idrv so as to obtain the first drive current (Ib2+Idrv2) for the LD 101a emitting light with the target first light emission amount Pdrv.

In step S104 illustrated in FIG. 5, the CPU 1082 instructs the ASIC 1081 to perform APC for the second light emission amount (second and subsequent times). In time t2 to t3 illustrated in FIG. 6C, the second drive current Ib becomes the target current value Ib2. Meanwhile, in time t2 to t3 illustrated in FIG. 6D, the second light emission amount is also adjusted to the target value Pb.

In step S105 illustrated in FIG. 5, the CPU 1082 instructs the ASIC 1081 to perform APC for the first light emission amount (second and subsequent times). In this step, in time t3 to t4 illustrated in FIGS. 6C and 6D, the laser drive circuit 107 adjusts the drive current Idrv so as to obtain the first drive current (Ib2+Idrv2) for the LD 101a emitting light with the target first light emission amount Pdrv.

In step S106, the CPU 1082 monitors the rotational speed of the scanner motor 110 calculated by the ASIC 1081 based on the detection result of the BD sensor 106 at every fixed interval (e.g., on a round robin basis), to determine whether the target speed has been reached. When the target speed has not been reached (NO in step S106), the CPU 1082 instructs the ASIC 1081 to perform APC for the second light emission amount (second and subsequent times) in step S104. On the other hand, when the target speed has been reached (YES in step S106), the CPU 1082 ends the activation sequence. Upon completion of the activation sequence, the engine controller 108 receives the Data signal corresponding to an image data signal from the video controller 109, and then performs an exposure process for forming a latent image on the photosensitive drum 5 through the light emission from the LD 101a. In this manner, setting the execution period of APC for the second light emission amount (first time) to a value longer than the execution period of APC for the second light emission amount (second time) can bring the voltage value of the reference voltage Vref21 as close to the target voltage value as possible in the execution period of APC for the second light emission amount (first time). Thus, subsequent overshoots of the drive current can be prevented.

According to the present exemplary embodiment, as described above, an overshoot of the drive current supplied to the light emitting unit can be prevented in the adjustment process from reception of an image forming instruction until before the exposure process for exposing a photosensitive member to light.

A second exemplary embodiment will now be described below. The second exemplary embodiment will be described centering on a method for preventing an overshoot of the light emission amount in the activation sequence of the laser scanner by setting the voltage value of the reference voltage Vref21 in APC for the second light emission amount (first time) to a value higher than the voltage value of the reference voltage Vref21 in APC for the second light emission amount (second time). Elements equivalent to those in the first exemplary embodiment are assigned the same reference numerals, and descriptions will be made only on elements different from those in the first exemplary embodiment.

[Method for Activating Optical Scanning Device]

Figure 7:
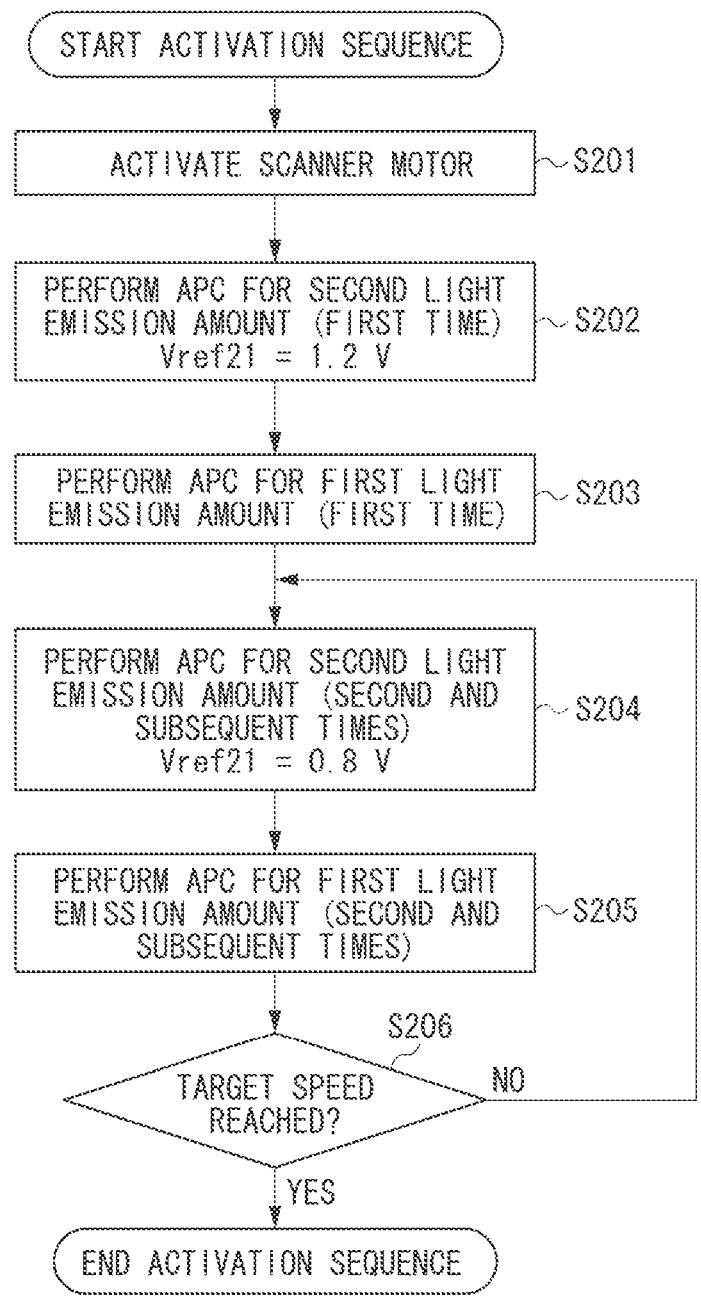
FIG. 7 is a flowchart illustrating an activation sequence of a laser scanner according to a second exemplary embodiment.

Operations in the activation sequence of the laser scanner (operations performed when activating the laser drive circuit 107) will be described below. FIG. 7 is a flowchart illustrating the activation sequence of the laser scanner (process for adjusting the drive current to be supplied to the LD 101a). This processing is performed by the CPU 1082 upon reception of an image forming instruction from the host computer (not illustrated). FIGS. 8A, 8B, 8C, 8D, and 8E illustrate changes with time of the operation mode, the PWM2 signal, the reference voltage Vref21, the drive current, and the light emission amount, respectively, in the activation sequence of the laser scanner. FIGS. 8A, 8B, 8C, 8D, and 8E illustrate the operation mode, the setting state of the PWM2 signal, the reference voltage Vref21, the drive current of the light emitting element, and the light emission amount of the light emitting element, respectively. Time 0 (t=0) illustrated in FIGS. 8A, 8B, 8C, 8D, and 8E corresponds to step S201 illustrated in FIG. 7. At this timing, the laser drive circuit 107 starts the activation sequence of the laser scanner.

In step S201 illustrated in FIG. 7, the CPU 1082 communicates with the ASIC 1081 to instruct the ASIC 1081 to activate the scanner motor 110. In step S202, the CPU 1082 instructs the ASIC 1081 to perform APC for the second light emission amount (first time). In time 0 to t1 illustrated in FIG. 8B, the ASIC 1081 sets the target value of the reference voltage Vref21 to 1.2 V via the PWM2 signal, which is higher than the final target value (0.8 V) of the reference voltage Vref21. Accordingly, in time 0 to t1 illustrated in FIG. 8C, the reference voltage Vref21 can be set to 0.8 V or higher.

As a result, in time 0 to t1 illustrated in FIG. 8D, the second drive current Ib reaches a current value Ib3, which is equal to or larger than the target current value Ib2. In time 0 to t1 illustrated in FIG. 8E, the second light emission amount is also adjusted to a light emission amount Pb1, which is equal to or larger than the target value Pb.

In step S203 illustrated in FIG. 7, the CPU 1082 instructs the ASIC 1081 to perform APC for the first light emission amount (first time). In time t1 to t2 illustrated in FIG. 8B, the ASIC 1081 sets the reference voltage Vref21 to the target value 0.8 V via the PWM2 signal.

In this case, in time t1 to t2 illustrated in FIGS. 8D and 8E, the laser drive circuit 107 adjusts the drive current Idrv so as to obtain the first drive current (Ib3+Idrv3) for the LD 101a emitting light with the target first light emission amount Pdrv.

In step S204 illustrated in FIG. 7, the CPU 1082 instructs the ASIC 1081 to perform APC for the second light emission amount (second and subsequent times). In time t2 to t3 illustrated in FIG. 8D, the second drive current Ib becomes the target current value Ib2. Meanwhile, in time t2 to t3 illustrated in FIG. 8E, the second light emission amount is also adjusted to the target value Pb.

In step S205 illustrated in FIG. 7, the CPU 1082 instructs the ASIC 1081 to perform APC for the first light emission amount (second and subsequent times). In this step, in time t3 to t4 illustrated in FIGS. 8D and 8E, the laser drive circuit 107 adjusts the drive current Idrv so as to obtain the first drive current (Ib2+Idrv2) for the LD 101a emitting light with the target first light emission amount Pdrv.

In step S206, the CPU 1082 monitors the rotational speed of the scanner motor 110 calculated by the ASIC 1081 based on the detection result of the BD sensor 106 at every fixed interval (e.g., on a round robin basis), to determine whether the target speed has been reached. When the target speed has not been reached (NO in step S206), the CPU 1082 instructs the ASIC 1081 to perform APC for the second light emission amount (second and subsequent times) in step S204. On the other hand, when the target speed has been reached (YES in step S206), the CPU 1082 ends the activation sequence. Upon completion of the activation sequence, the engine controller 108 receives the Data signal from the video controller 109, and then performs an exposure process for exposing the photosensitive drum 5 to light from the LD 101a.

In the present exemplary embodiment, the ASIC 1081 sets the target value of the reference voltage Vref21 for APC for the second light emission amount (for the second current adjustment process) to 1.2 V (first time) and 0.8 V (second time) via the PWM2 signal. The target value set for the first time is higher than the target value set for the second time. These settings can prevent an overshoot of the drive current of the LD 101a in APC for the first light emission amount (second time).

According to the present exemplary embodiment, as described above, an overshoot of the drive current supplied to the light emitting unit can be prevented in the adjustment process from reception of an image forming instruction until before the exposure process for exposing a photosensitive member to light. According to the present exemplary embodiment, the execution period of APC for the second light emission amount (first time) can be made shorter than that in the first exemplary embodiment, making it possible to reduce the activation time of the laser scanner compared with the first exemplary embodiment.

A third exemplary embodiment will now be described below. The third exemplary embodiment will be described centering on a method for preventing an overshoot of the light emission amount in the activation sequence of the laser scanner by setting the voltage value of the reference voltage Vref11 in APC for the first light emission amount (first time) to a value lower than the voltage value of the reference voltage Vref11 in APC for the first light emission amount (second time). Elements equivalent to those in the second exemplary embodiment are assigned the same reference numerals, and descriptions will be made only on elements different from those in the second exemplary embodiment.

[Method for Activating Optical Scanning Device]

Operations in the activation sequence of the laser scanner (operations performed when activating the laser drive circuit 107) will be described below. FIG. 9 is a flowchart illustrating the activation sequence of the laser scanner (process for adjusting the drive current to be supplied to the LD 101a). This processing is performed by the CPU 1082 upon reception of an image forming instruction from the host computer (not illustrated). FIGS. 10A, 10B, 10C, 10D, 10E, 10F, and 10G illustrate changes with time of the operation mode, the PWM2 signal, the PWM1 signal, the reference voltage Vref21, the reference voltage Vref11, the drive current, and the light emission amount, respectively, in the activation sequence of the laser scanner. FIGS. 10A, 10B, 10C, 10D, 10E, 10F, and 10G illustrate the operation mode, the setting state of the PWM2 signal, the setting state of the PWM1 signal, the reference voltage Vref21, the reference voltage Vref11, the drive current of the light emitting element, and the light emission amount of the light emitting element, respectively. Time 0 (t=0) illustrated in FIGS. 10A, 10B, 10C, 10D, 10E, 10F, and 10G corresponds to step S301 illustrated in FIG. 9. At this timing, the laser drive circuit 107 starts the activation sequence of the laser scanner.

In step S301 illustrated in FIG. 9, the CPU 1082 communicates with the ASIC 1081 to instruct the ASIC 1081 to activate the scanner motor 110. In step S302, the CPU 1082 instructs the ASIC 1081 to perform APC for the second light emission amount (first time). In time 0 to t1 illustrated in FIG. 10B, the ASIC 1081 sets the reference voltage Vref21 to the target value 0.8 V via the PWM2 signal. Meanwhile, in time 0 to t1 illustrated in FIG. 10D, the reference voltage Vref21 has not reached the target voltage value 0.8 V. As a result, in time 0 to t1 illustrated in FIG. 10F, the second drive current Ib reaches a current value Ib4, which is smaller than the target current value Ib2. In time 0 to t1 illustrated in FIG. 10G, the second light emission amount is also adjusted to Pb2, which is smaller than the target value Pb.

Meanwhile, in time 0 to t1 illustrated in FIG. 10C, the ASIC 1081 sets the reference voltage Vref11 to 0.4 V, which is lower than the target value (1.0 V) of the reference voltage Vref11 via the PWM1 signal.

In step S303 illustrated in FIG. 9, the CPU 1082 instructs the ASIC 1081 to perform APC for the first light emission amount (first time). In time t1 to t2 illustrated in FIGS. 10F and 10G, the laser drive circuit 107 adjusts the drive current Idrv so as to obtain the first drive current (Ib4+Idrv3) for the LD 101a emitting light with a light emission amount Pdrv2. In this case, the light emission amount Pdrv2 is sufficiently smaller than the target first light emission amount Pdrv.

In step S304 illustrated in FIG. 9, the CPU 1082 instructs the ASIC 1081 to perform APC for the second light emission amount (second and subsequent times). In time t2 to t3 illustrated in FIG. 10F, the second drive current Ib becomes the target current value Ib2. Meanwhile, in time t2 to t3 illustrated in FIG. 10G, the second light emission amount is also adjusted to the target value Pb.

In step S305 illustrated in FIG. 9, the CPU 1082 instructs the ASIC 1081 to perform APC for the first light emission amount (second and subsequent times). In this step, in time t3 to t4 illustrated in FIGS. 10F and 10G, the laser drive circuit 107 adjusts the drive current Idrv so as to obtain the first drive current (Ib2+Idrv2) for the LD 101a emitting light with the target first light emission amount Pdrv. In this case, a condition "(Ib2+Idrv2)>(Ib2+Idrv3)" is satisfied in relation to the first drive current.

In step S306 illustrated in FIG. 9, the CPU 1082 monitors the rotational speed of the scanner motor 110 calculated by the ASIC 1081 based on the detection result of the BD sensor 106 at every fixed interval (e.g., on a round robin basis), to determine whether the target speed has been reached. When the target speed has not been reached (NO in step S306), the CPU 1082 instructs the ASIC 1081 to perform APC for the second light emission amount (second and subsequent times) in step S304. On the other hand, when the target speed has been reached (YES in step S306), the CPU 1082 ends the activation sequence. Upon completion of the activation sequence, the engine controller 108 receives the Data signal from the video controller 109, and then performs an exposure process for exposing the photosensitive drum 5 to light from the LD 101a.

In the present exemplary embodiment, the ASIC 1081 sets the target value of the reference voltage Vref11 for APC for the first light emission amount (for the first current adjustment process) to 0.4 V (first time) and 1.0 V (second time) via the PWM1 signal. The target value set for the first time is lower than the target value set for the second time. These settings can prevent an overshoot of the drive current of the LD 101a in APC for the first light emission amount (second time).

According to the present exemplary embodiment, as described above, an overshoot of the drive current supplied to the light emitting unit can be prevented in the adjustment process from reception of an image forming instruction until before the exposure process for exposing a photosensitive member to light. According to the present exemplary embodiment, the execution period of APC for the second light emission amount (first time) can be made shorter than that in the first exemplary embodiment, making it possible to reduce the activation time of the laser scanner compared with the first exemplary embodiment.

According to an exemplary embodiment, an overshoot of the drive current supplied to the light emitting unit can be prevented in the adjustment process from reception of an image forming instruction until before the exposure process for exposing a photosensitive member to light.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2014-250408, filed Dec. 10, 2014, which is hereby incorporated by reference herein in its entirety.

What is claimed is:

1. An image forming apparatus comprising:
    a light emitting unit configured to emit light by being supplied with a current;
    a light receiving unit configured to receive the light emitted from the light emitting unit and output a value related to a light reception amount; and
    a control unit configured to control light emission from the light emitting unit,
    wherein, after reception of an image forming instruction, the control unit performs adjustment for adjusting a superimposed current of first and second currents, and the second current through comparison between the value output from the light receiving unit and a reference value set based on a target setting signal, and after the adjustment, supplies the superimposed current of the first and the second currents or the second current to the light emitting unit to cause the light emitting unit to emit light,
    wherein the adjustment includes a first adjustment for adjusting the first current by supplying the superimposed current of the first and the second currents to the light emitting unit, and a second adjustment for adjusting the second current by supplying the second current to the light emitting unit without supplying the first current thereto,
    wherein, upon reception of the image forming instruction, the control unit performs adjustment in order of the second adjustment for the first time, the first adjustment for the first time, the second adjustment for the second time, and the first adjustment for the second time, and
    wherein an execution period of the second adjustment for the first time is longer than an execution period of the second adjustment for the second time.

2. The image forming apparatus according to claim 1, wherein, in the adjustment, the control unit adjusts the first and the second currents to decrease a difference between the value output from the light receiving unit and a reference voltage value as the reference value.

3. The image forming apparatus according to claim 2, wherein the control unit includes a circuit for outputting the reference voltage value in the second adjustment, and the circuit is provided with a capacitor that is charged based on the target setting signal, and outputs a voltage to be used as the reference voltage value.

4. The image forming apparatus according to claim 1, wherein the control unit performs, after the adjustment, exposure for exposing a photosensitive member to light emitted from the light emitting unit, by supplying the superimposed current of the first and the second currents or the second current to the light emitting unit to cause the light emitting unit to emit light,
    wherein, when the superimposed current of the first and the second currents is supplied to the light emitting unit, the light emitting unit emits light with a light amount for attenuating a potential of the charged photosensitive member to a potential for adhering developer, and wherein, when the second current is supplied to the light emitting unit without supplying the first current thereto, the light emitting unit emits light with a light amount for attenuating the potential of the charged photosensitive member to a potential for not adhering developer.

5. An image forming apparatus comprising:
a light emitting unit configured to emit light by being supplied with a current;
a light receiving unit configured to receive the light emitted from the light emitting unit and output a value related to a light reception amount; and
a control unit configured to control light emission from the light emitting unit,
wherein, after reception of an image forming instruction, the control unit performs adjustment for adjusting a superimposed current of first and second currents, and the second current through comparison between the value output from the light receiving unit and a reference value set based on a target setting signal, and after the adjustment, supplies the superimposed current of the first and the second currents or the second current to the light emitting unit to cause the light emitting unit to emit light,
wherein the adjustment includes a first adjustment for adjusting the first current by supplying the superimposed current of the first and the second currents to the light emitting unit, and a second adjustment for adjusting the second current by supplying the second current to the light emitting unit without supplying the first current thereto,
wherein, upon reception of the image forming instruction, the control unit performs adjustment in order of the second adjustment for the first time, the first adjustment for the first time, the second adjustment for the second time, and the first adjustment for the second time, and
wherein a target value of the reference value set for the second adjustment for the first time via the target setting signal is larger than a target value of the reference value set for the second adjustment for the second time via the target setting signal.

6. The image forming apparatus according to claim 5, wherein, in the adjustment, the control unit adjusts the first and the second currents to decrease a difference between the value output from the light receiving unit and a reference voltage value as the reference value.

7. The image forming apparatus according to claim 6, wherein the control unit includes a circuit for outputting the reference voltage value in the second adjustment, and the circuit is provided with a capacitor that is charged based on the target setting signal, and outputs a voltage to be used as the reference voltage value.

8. The image forming apparatus according to claim 5, wherein the control unit performs, after the adjustment, exposure for exposing a photosensitive member to light emitted from the light emitting unit, by supplying the superimposed current of the first and the second currents or the second current to the light emitting unit to cause the light emitting unit to emit light,
wherein, when the superimposed current of the first and the second currents is supplied to the light emitting unit, the light emitting unit emits light with a light amount for attenuating a potential of the charged photosensitive member to a potential for adhering developer, and
wherein, when the second current is supplied to the light emitting unit without supplying the first current thereto, the light emitting unit emits light with a light amount for attenuating the potential of the charged photosensitive member to a potential for not adhering developer.

9. An image forming apparatus comprising:
a light emitting unit configured to emit light by being supplied with a current;
a light receiving unit configured to receive the light emitted from the light emitting unit and output a value related to a light reception amount; and
a control unit configured to control light emission from the light emitting unit,
wherein, after reception of an image forming instruction, the control unit performs adjustment for adjusting a superimposed current of first and second currents, and the second current through comparison between the value output from the light receiving unit and a reference value set based on a target setting signal, and after the adjustment, supplies the superimposed current of the first and the second currents or the second current to the light emitting unit to cause the light emitting unit to emit light,
wherein the adjustment includes a first adjustment for adjusting the first current by supplying the superimposed current of the first and the second currents to the light emitting unit, and a second adjustment for adjusting the second current by supplying the second current to the light emitting unit without supplying the first current thereto,
wherein, upon reception of the image forming instruction, the control unit performs adjustment in order of the second adjustment for the first time, the first adjustment for the first time, the second adjustment for the second time, and the first adjustment for the second time, and
wherein a target value of the reference value set for the first adjustment for the first time via the target setting signal is smaller than a target value of the reference value set for the first adjustment for the second time via the target setting signal.

10. The image forming apparatus according to claim 9, wherein, in the adjustment, the control unit adjusts the first and the second currents to decrease a difference between the value output from the light receiving unit and a reference voltage value as the reference value.

11. The image forming apparatus according to claim 10, wherein the control unit includes a circuit for outputting the reference voltage value in the second adjustment, and the circuit is provided with a capacitor that is charged based on the target setting signal, and outputs a voltage to be used as the reference voltage value.

12. The image forming apparatus according to claim 9, wherein the control unit performs, after the adjustment, exposure for exposing a photosensitive member to light emitted from the light emitting unit, by supplying the superimposed current of the first and the second currents or the second current to the light emitting unit to cause the light emitting unit to emit light,
wherein, when the superimposed current of the first and the second currents is supplied to the light emitting unit, the light emitting unit emits light with a light amount for attenuating a potential of the charged photosensitive member to a potential for adhering developer, and
wherein, when the second current is supplied to the light emitting unit without supplying the first current thereto, the light emitting unit emits light with a light amount for attenuating the potential of the charged photosensitive member to a potential for not adhering developer.

* * * * *